United States Patent
Kingston

(10) Patent No.: US 11,754,125 B2
(45) Date of Patent: *Sep. 12, 2023

(54) UNIVERSAL JOINT WITH REINFORCED YOKE EARS

(71) Applicant: Spidertrax Inc., Loveland, CO (US)

(72) Inventor: Thomas John Kingston, Loveland, CO (US)

(73) Assignee: SPIDERTRAX, INC., Loveland, CO (US)

( * ) Notice: Subject to any disclaimer, the term of this patent is extended or adjusted under 35 U.S.C. 154(b) by 218 days.

This patent is subject to a terminal disclaimer.

(21) Appl. No.: 17/221,906

(22) Filed: Apr. 5, 2021

(65) Prior Publication Data

US 2021/0270326 A1  Sep. 2, 2021

Related U.S. Application Data

(63) Continuation of application No. 16/001,642, filed on Jun. 6, 2018, now Pat. No. 10,968,959.

(51) Int. Cl.
*F16D 3/40*  (2006.01)
(52) U.S. Cl.
CPC ........ *F16D 3/40* (2013.01); *F16D 2250/0084* (2013.01); *Y10T 29/49963* (2015.01); *Y10T 403/7098* (2015.01)
(58) Field of Classification Search
CPC ............... F16D 3/40; F16D 2250/0084; Y10T 29/49963; Y10T 403/7098
(Continued)

(56) References Cited

U.S. PATENT DOCUMENTS

| 1,354,912 | A | * | 10/1920 | Lockton | ................... F16D 3/38 464/134 |
| 1,367,578 | A | | 2/1921 | Ziegler | |

(Continued)

FOREIGN PATENT DOCUMENTS

| EP | 0 078 718 A1 | * | 5/1983 | ................... 464/134 |
| EP | 2803877 | | 11/2014 | |
| GB | 2358903 | | 6/2004 | |

OTHER PUBLICATIONS

Dana 30/44 GM10 U-Joint—OX USA http://www.ox-usa.com/products/54-amc-20-heavy-duty-cover.html 2018.

*Primary Examiner* — Greg Binda
(74) *Attorney, Agent, or Firm* — Holzer Patel Drennan

(57) ABSTRACT

A universal joint for vehicle drivetrains and the like that eliminates the spinning of bearing caps relative to yoke years and trunnions and inhibits inadvertent spreading of opposing ears of a yoke away from each other under increasing torsional loads to reduce wear and failure of the joint. Broadly, the disclosed universal joint includes a central body having a plurality of pairs of opposite apertures, first and second yokes that are disposed about the central body over respective ones of the pairs of apertures, and a plurality of trunnions inserted through the yoke ears and into the apertures of the body to pivotally secure the yokes to the body. Each trunnion is non-rotatable relative to its respective yoke and a locking assembly inhibits movement of each opposite pair of trunnions away from each other thereby inhibiting movement of the opposite ears of each respective yoke away from each other.

19 Claims, 12 Drawing Sheets

(58) Field of Classification Search
USPC .............. 464/134, 136; 403/383; 29/525.11
See application file for complete search history.

(56) References Cited

U.S. PATENT DOCUMENTS

| | | | |
|---|---|---|---|
| 1,918,613 A | | 7/1933 | Peters |
| 2,264,727 A | | 12/1941 | Stillwagon |
| 3,213,644 A | | 10/1965 | Murphy |
| 4,365,488 A | | 12/1982 | Mochida |
| 5,417,613 A | * | 5/1995 | Aiken .................. F16C 35/067 |
| | | | 464/134 |
| 5,634,853 A | | 1/1997 | Smith |
| 6,846,242 B1 | | 1/2005 | Rivera |
| 6,976,922 B2 | | 12/2005 | Smith |
| 2009/0041535 A1 | | 2/2009 | Hu |

\* cited by examiner

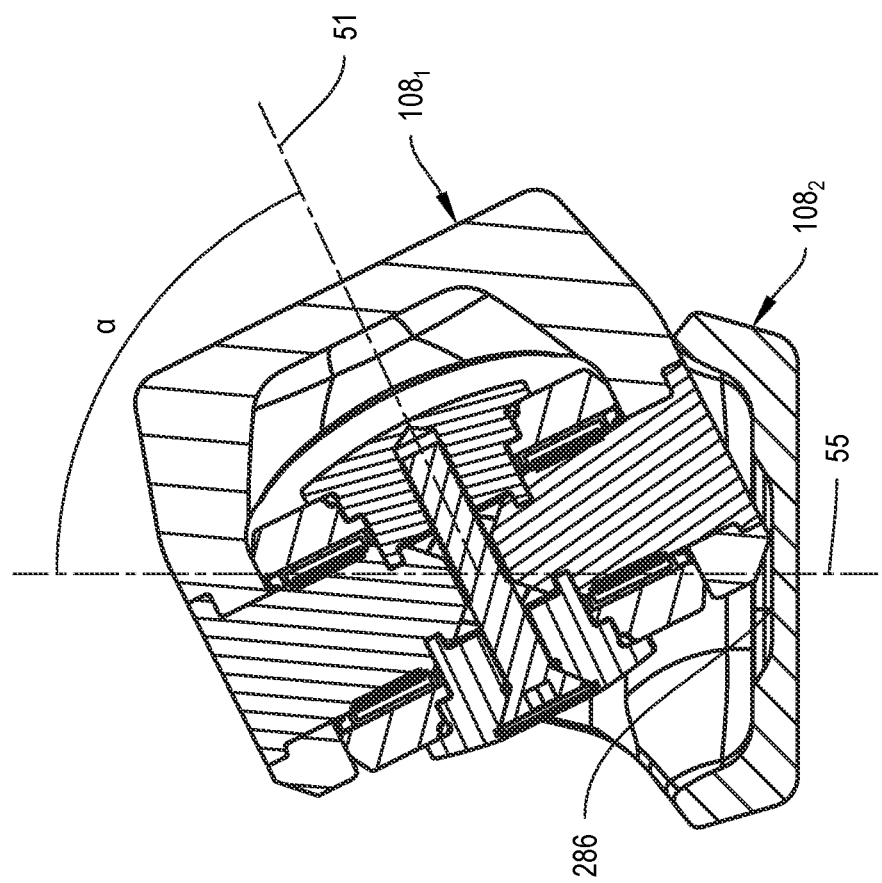
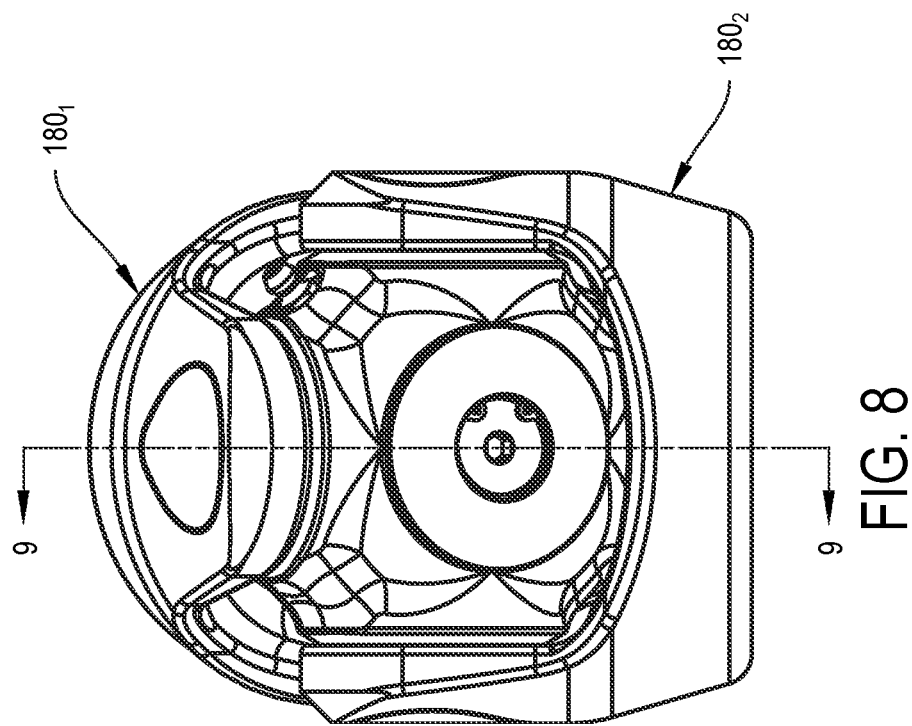
FIG. 9
FIG. 8

UNIVERSAL JOINT WITH REINFORCED YOKE EARS

1. CROSS REFERENCE TO RELATED APPLICATIONS

The present application is a continuation application of U.S. patent application Ser. No. 16/001,642, filed on Jun. 6, 2018, now U.S. Pat. No. 10,968,959, issued Apr. 6, 2021, entitled "Universal Joint with Reinforced Yoke Ears and Positively Locked Trunnions" and which is hereby incorporated by reference for all that it discloses or teaches.

2. FIELD OF THE INVENTION

The present invention generally relates to universal joints for connecting torque transmitting shafts and, in particular, to a universal joint for connecting torque transmitting shafts of a drivetrain of a motor vehicle.

3. RELEVANT BACKGROUND

A drive axle assembly or drivetrain of an automotive vehicle transmits torque from an engine and a transmission to drive wheels of the vehicle. The drivetrain changes the direction of the power flow, multiplies torque, and allows different speeds between the two of the drive wheels. Among other components engaged in operative communication with each other, the drivetrain typically includes one or more universal joints that are subject to high torsional loads. A universal joint is a coupling that can transmit rotary power from a first shaft to an adjacent second shaft that is non-collinear with the first shaft. Typically, a universal joint includes a pair of yokes or yoke members that are secured to respective drive shafts and that are interconnected by a cruciform or "spider" for rotation about independent axes (e.g., perpendicular axes). The spider includes four orthogonal trunnions (pivot pins) with each opposing pair of axially aligned trunnions mounted in a pair of aligned bores formed in spaced arms of one of the yokes.

A bearing cup or cap is often secured over each trunnion such that each yoke is supported for pivotal movement relative to its respective pair of the trunnions. Snap rings or the like are typically used to prevent inadvertent removal of bearing caps from the trunnions. Various conventional universal joints having yoke portions are known to those skilled in the vehicle driveline art and are widely used in the automotive industry today.

SUMMARY

Under increasing torsional loads, the bearing caps of existing universal joints are prone to spinning relative to the trunnions and yoke ears to which they are attached or secured. Such spinning of the bearing caps can lead to weakening of the yokes, loosening and eventually ejection of the snap rings designed to secure the bearing caps to the trunnions, and sometime even failure of the universal joints. Furthermore, when a first shaft is turned at a significant angle relative to a second shaft through existing universal joints and is under extreme torque, forces are generated that tend to push the first and second opposing ears of each yoke away from each other which can lead to weakening and failure of the yokes. Other than the snap rings, existing universal joints are typically devoid of structure to prevent or at least limit such inadvertent spreading of opposing ears of a yoke away from each other.

In view of at least the foregoing, disclosed herein is a universal joint for vehicle drivetrains and the like that eliminates the spinning of bearing caps relative to yoke years and trunnions and inhibits inadvertent spreading of opposing ears of a yoke away from each other under increasing torsional loads. Broadly, the disclosed universal joint includes a central body having a plurality of pairs of opposite apertures, first and second yokes that are disposed about the central body over respective ones of the pairs of apertures, and a plurality of trunnions that are inserted through the yoke ears and into the apertures of the body to pivotally secure the yokes to the body. Each trunnion is non-rotatable relative to the yoke that it is pivotally securing to the central body to inhibit spinning of the trunnion relative to the yoke and the attendant weakening of the yokes and possible failure of the universal joint. In other words, each trunnion may be positively locked to its respective yoke. For instance, each trunnion having a non-circular head that is configured to be seated into a corresponding non-circular depression in the yoke. Furthermore, a locking assembly is inserted into one of the pairs of apertures in the central body and is configured to inhibit movement of each opposite pair of trunnions away from each other. Inhibiting movement of each opposite pair of trunnions away from each other thereby also inhibits movement of the opposite ears of each respective yoke away from each other. The resulting universal joint can advantageously withstand increasing operational loads substantially free of many of the disadvantages of existing universal joints.

In one aspect, a universal joint for connecting first and second torque transmitting shafts is disclosed that includes a central body having first and second opposite apertures through which a first reference axis is defined and third and fourth opposite apertures through which a second reference axis is defined; a first yoke portion that is configured to be secured to a first torque transmitting shaft, where the first yoke portion includes first and second spaced opposite ears that are respectively disposed over the first and second opposite apertures; first and second opposite trunnions that are respectively inserted through the first and second ears of the first yoke portion and the first and second apertures of the central body to secure the first yoke portion to the central body for pivoting about the first reference axis, where the first and second trunnions are non-rotatable relative to the first yoke portion; a second yoke portion that is configured to be secured to a second torque transmitting shaft, where the second yoke portion includes first and second spaced opposite ears that are respectively disposed over the third and fourth opposite apertures; and third and fourth opposite trunnions that are respectively inserted through the first and second ears of the second yoke portion and the third and fourth apertures of the central body to secure the second yoke portion to the central body for pivoting about the second reference axis, where the third and fourth trunnions are non-rotatable relative to the second yoke portion.

In another aspect disclosed herein, a universal joint for connecting first and second torque transmitting shafts includes a central body having first and second opposite apertures through which a first reference axis is defined and third and fourth opposite apertures through which a second reference axis is defined; a first yoke portion that is configured to be secured to a first torque transmitting shaft, where the first yoke portion includes first and second spaced opposite ears that are respectively disposed over the first and second opposite apertures; first and second opposite trunnions that are respectively inserted through the first and second ears of the first yoke portion and the first and second apertures of the central body to secure the first yoke portion to the central body for pivoting about the first reference axis; a second yoke portion that is configured to be secured to a second torque transmitting shaft, where the second yoke portion includes first and second spaced opposite ears that are respectively disposed over the third and fourth opposite apertures; third and fourth opposite trunnions that are respectively inserted through the first and second ears of the second yoke portion and the third and fourth apertures of the central body to secure the second yoke portion to the central body for pivoting about the second reference axis; and a locking assembly disposed within the central body and secured to the first, second, third and fourth trunnions to inhibit movement thereof along the first and second reference axes, respectively. The depression of each of the first and second apertures of the first yoke portion is defined by a lower surface, and the head of each of the first and second trunnions includes a surface that contacts the lower surface of the respective one of the first and second apertures of the first yoke portion to inhibit movement of the first and second ears of the first yoke in first and second opposite direction along the first reference axis. Furthermore, the depression of each of the first and second apertures of the second yoke portion is defined by a lower surface, and the head of each of the third and fourth trunnions includes a surface that contacts the lower surface of the respective one of the first and second apertures of the second yoke to inhibit movement of the first and second ears of the second yoke portion in first and second opposite direction along the second reference axis.

In a further aspect disclosed herein, a method of assembling a universal joint includes positioning first and second spaced ears of a first yoke portion over respective first and second spaced apertures of a central body; inserting a first trunnion through the first ear of the first yoke portion and the first aperture of the central body along a first reference axis until a head of the first trunnion is seated within a non-circular depression of the first ear of the first yoke portion to inhibit relative rotation between the first trunnion and the first yoke portion; inserting a second trunnion through the second ear of the first yoke portion and the second aperture of the central body along the first reference axis until a head of the second trunnion is seated within a non-circular depression of the second ear of the first yoke portion to inhibit relative rotation between the second trunnion and the first yoke portion; and inserting a locking apparatus into central body and into contact with the first and second trunnions to inhibit movement of the first and second trunnions along the first reference axis while allowing for rotation of the first trunnion, second trunnion, and first yoke portion about the first reference axis relative to the locking member.

In addition to the exemplary aspects and embodiments described above, further aspects and embodiments will become apparent by reference to the drawings and by study of the following descriptions.

BRIEF DESCRIPTION OF THE DRAWINGS

FIG. 8 is an elevational view similar to FIG. 6, but with the first and second yoke portions being in a different position relative to each other.

FIG. 9 is a sectional view along the line 9-9 of FIG. 8.

DETAILED DESCRIPTION

Figure 1:
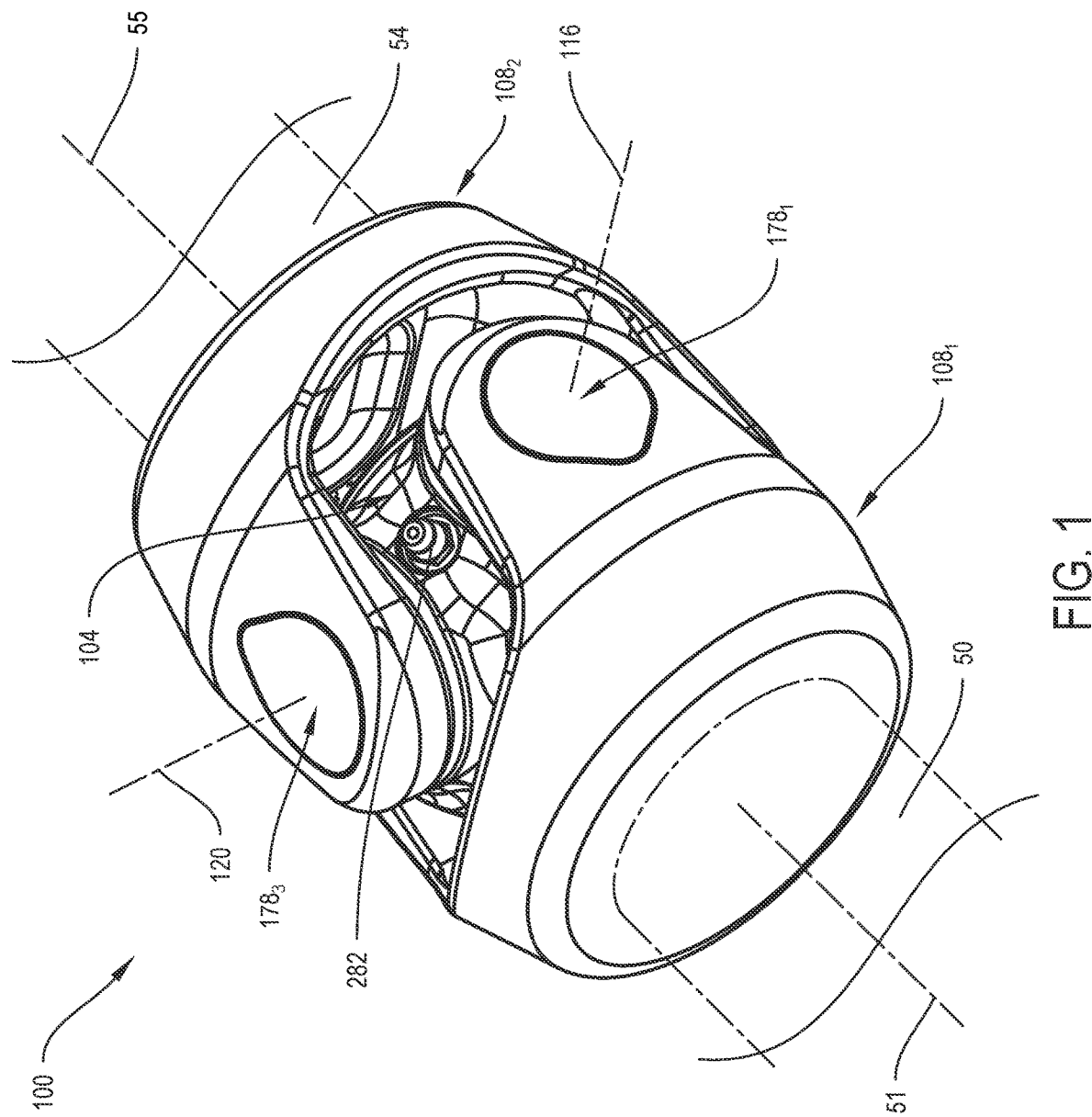
FIG. 1 is a perspective view of a universal joint according to an embodiment disclosed herein, the universal joint broadly including first and second yoke portions pivotally attached to a central body.
Figure 2:
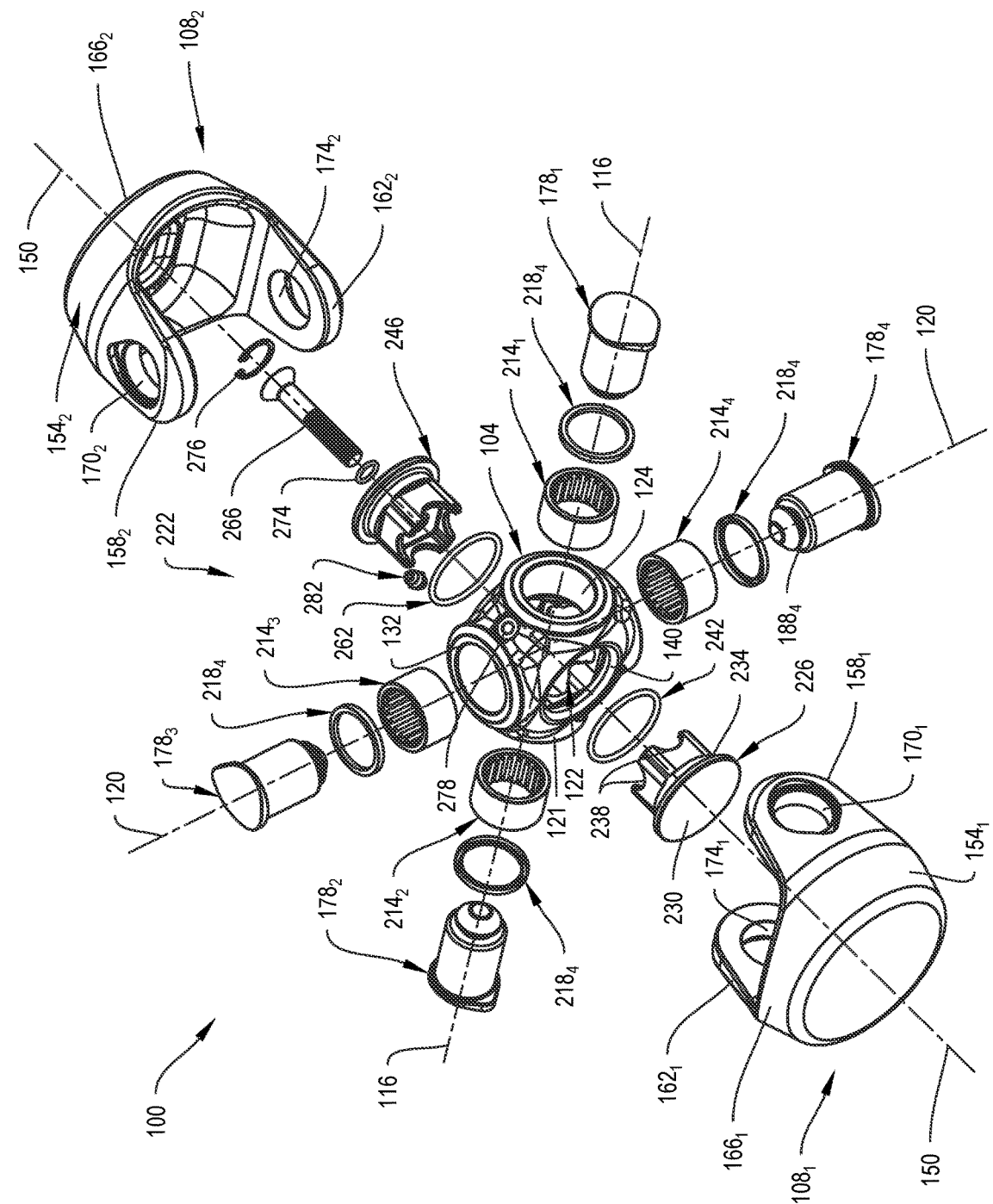
FIG. 2 is an exploded perspective view of the universal joint of FIG. 1.
Figure 4:
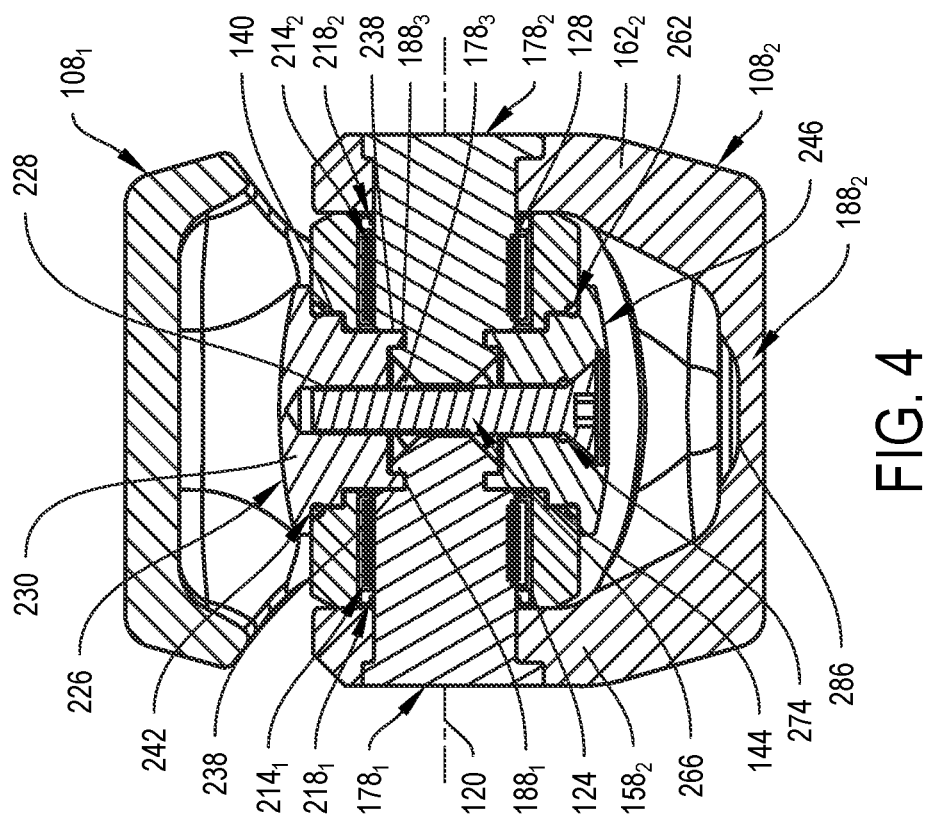
FIG. 4 is a sectional view along the line 4-4 of FIG. 3.
Figure 3:
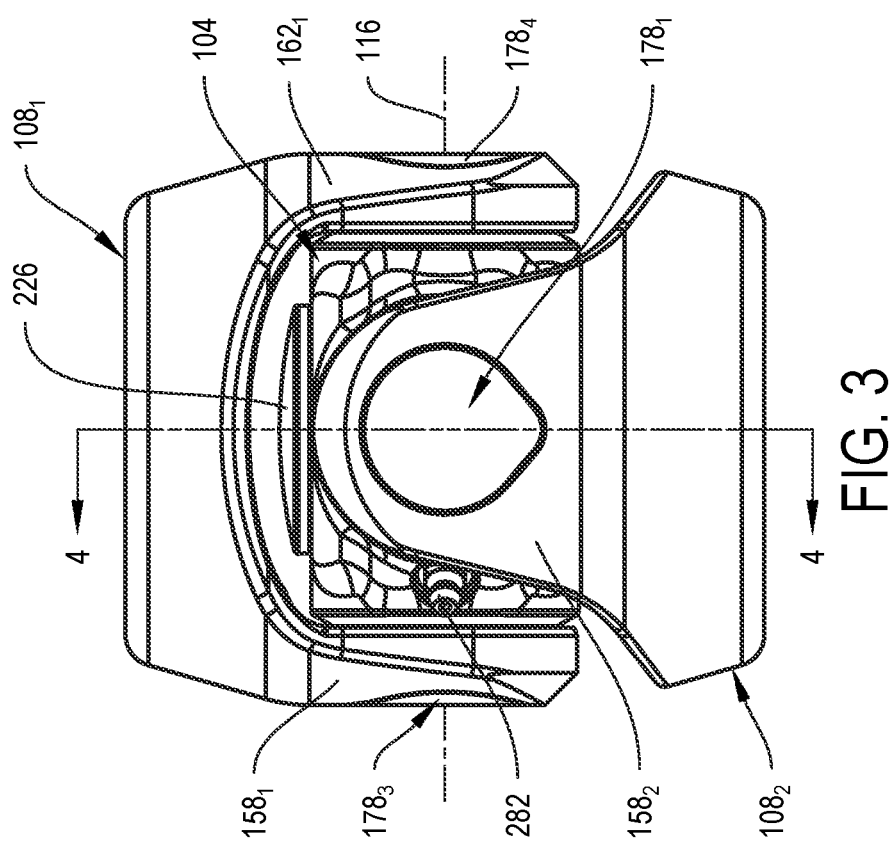
FIG. 3 is an elevational view of the universal joint of FIG. 1.

The present disclosure is generally directed to a universal joint that eliminates the spinning of bearing caps relative to yoke years and trunnions and inhibits inadvertent spreading of opposing ears of a yoke away from each other under increasing torsional loads to reduce wear and failure of the joint. While the disclosed universal joint is primarily discussed herein for use in a vehicle drivetrain (e.g., drive shafts, axle shafts, etc.), it is to be understood that the joint can find use in numerous other contexts (e.g., power tools) which are encompassed in the present disclosure.

With initial reference to FIGS. 1-4, a universal joint 100 for transmitting rotary power (e.g., torque) from a first shaft 50 (e.g., axle shaft) to an adjacent second shaft 54 (e.g., stub shaft) over a variety of angles between respective longitudinal axes 51, 55 of the first and second shafts 50, 54 is illustrated. Broadly, the universal joint 100 includes a central body 104 having a housing 121 that generally defines an internal cavity 122 along with first and second yoke members or portions $108_1$, $108_2$ that are respectively rigidly (i.e., non-movably) attached to the first and second shafts 50, 54 in any appropriate manner and pivotally attached to the central body 104 for pivotal movement about respective first and second reference axes 116, 120 as discussed below.

With additional reference to FIGS. 22-25, the central body 104 includes a plurality of pairs of opposing apertures extending through the housing 121 and leading into the internal cavity 122. For instance, the central body 104 may include first and second opposite apertures 124, 128 through which the first reference axis 116 extends and third and fourth opposite apertures 132, 136 through which the second reference axis 120 extends. In one arrangement, the central body 104 may further include fifth and sixth apertures 140, 144 through which a third reference axis 150 extends. While the first, second, and third reference axes 116, 120, 150 are all illustrated as perpendicular to each other, some embodiments envision that two or more of the first, second, and third reference axes 116, 120, 150 may be disposed at non-perpendicular angles to each other depending upon the particular envisioned application of the universal joint 100.

With reference to FIGS. 1-4, 10, and 11, the first yoke portion $108_1$ broadly includes a housing $154_1$ defining first and second spaced arms or ears $158_1$, $162_1$ that are rigidly (i.e., non-movably) interconnected by a bridge portion $166_1$, where the bridge portion $166_1$ may be rigidly interconnected to the first shaft 50. The first and second ears $158_1$, $162_1$ may be spaced by an amount that is slightly greater than a maximum outer cross-dimension of the central body 104 along the first reference axis 116 to allow the central body 104 to be just received between the first and second ears $158_1$, $162_1$ taking into account any acceptable tolerances. As shown, the first ear $158_1$ includes a first aperture $170_1$ therethrough that is configured to be disposed over the first aperture 124 of the central body 104 while the second ear $162_1$ includes a second aperture $174_1$ therethrough that is configured to be disposed over the second aperture 128 of the central body 104 along the first reference axis 116.

Similarly, and with reference to FIGS. 1-4, 12, and 13, the second yoke portion $108_2$ broadly includes a housing $154_2$ defining first and second spaced arms or ears $158_2$, $162_2$ that are rigidly (i.e., non-movably) interconnected by a bridge portion $166_2$, where the bridge portion $166_2$ may be rigidly interconnected to the second shaft 54. The first and second ears $158_2$, $162_2$ may be spaced by an amount that is slightly greater than a maximum outer cross-dimension of the central body 104 along the second reference axis 120 to allow the central body 104 to be just received between the first and second ears $158_2$, $162_2$ taking into account any acceptable tolerances. As shown, the first ear $158_2$ includes a first aperture $170_2$ therethrough that is configured to be disposed over the third aperture 132 of the central body 104 while the second ear $162_2$ includes a second aperture $174_2$ therethrough that is configured to be disposed over the fourth aperture 136 of the central body 104 along the second reference axis 120.

To secure the first and second yoke portions $108_1$, $108_2$ to the central body 104 for respective pivotal movement about the first and second reference axes 116, 120, a number of pivot pins or trunnions 178 may be inserted through the various ears of the first and second yoke portions $108_1$, $108_2$ and into the internal cavity 122 of the central body 104 along the first and second reference axes 116, 120. For instance, first and second opposite trunnions $178_1$, $178_2$ may be respectively inserted through the first and second apertures $170_1$, $174_1$ of the first and second ears $158_1$, $162_1$ of the first yoke portion $108_1$ and the first and second apertures 124, 128 of the central body 104 and into the internal cavity 122. See FIGS. 2 and 4. Similarly, third and fourth opposite trunnions $178_3$, $178_4$ may be respectively inserted through the first and second apertures $170_2$, $174_2$ of the first and second ears $158_2$, $162_2$ of the second yoke portion $108_2$ and the third and fourth apertures 132, 136 of the central body 104 and into the internal cavity 122.

With reference now to FIGS. 14-17, each trunnion 178 may include a head 182 with a pin body 186 extending away from the head 182 to a free end 190. The pin body 186 of each trunnion 178 is sized to pass through the respective ones of the apertures of the yoke portions and central body 104 while the head 182 has a maximum outer cross dimension (e.g., outer diameter) that is greater than a minimum internal cross dimension (e.g., inner diameter) of at least a portion of the aperture of the respective yoke portion (so that the head 182 makes contact with the yoke portion and can apply a force against the yoke portion as discussed later herein). In one embodiment, each of the first and second apertures $170_1$/$170_2$, $174_1$/$174_2$ of the first and second yoke portions $108_1$, $108_2$ may include a depression 194 defined by a bottom surface 198 (e.g., step) and a side surface 202 extending away from the bottom surface 198. See FIGS. 10-13. The bottom surface 198 may extend about a portion or an entirety of the respective aperture. The depression 194 defines a space that is configured to receive the head 182 of a trunnion 178 in a manner that prevents or inhibits rotation of the trunnion 178 about the respective one of the first and second reference axes 116, 120.

For instance, an outer perimeter 206 of the head 182 of each trunnion 178 and the side surface 202 of the depression 194 of each of the first and second apertures $170_1$/$170_2$, $174_1$/$174_2$ may have any appropriate non-circular shape (e.g., tear drop as illustrated, square, hexagonal, etc.) to inhibit rotation of the trunnion 178 about the respective one of the first and second reference axes 116, 120 when the head 182 is received in the depression 194. See FIGS. 2-4. Furthermore, a bottom surface 210 of the head 182 is configured to contact the bottom surface 198 of the depression 194 when the head 182 is seated or received therein. In one arrangement, a thickness of the head 182 of each trunnion 178 (e.g., height of the outer perimeter 206) may be approximately the same (e.g., taking account any appropriate tolerances) as a height of the side surface 202 of the depression 194. Furthermore, an overall curvature of the head 182 (or of the outer surface of the head 182) may generally match that of the respective one of the yoke ears. See FIGS. 6 and 16. In this regard, when the head 182 is fully received in the depression 194, the head 182 may substantially seamlessly blend in with an outside surface (not labeled) of the respective one of the ears of the yoke portion which advantageously protects the head 182 from environmental damage and the like.

To facilitate smooth and substantially frictionless rotation of each pin body 186 within the respective one of the apertures 124, 128, 132, 136 of the central body 104, any appropriate bearing structure 214 may be disposed or otherwise formed within each of the apertures 124, 128, 132, 136 to facilitate such rotation about the respective first or second reference axis 116, 120. In one arrangement, each bearing structure 214 may be in the form of a needle bearing as illustrated in FIGS. 1, 4, 7, and 9. However, the bearing structures 214 may take other forms such as a sleeve, liner, one-piece bushing, and/or the like. For instance, each bearing structure 214 may be selected to have a maximum outer cross-dimension (e.g., outer diameter) that is substantially the same as (e.g., slightly smaller than) a minimum internal cross dimension (e.g., inner diameter) of the respective aperture 124, 128, 132, 136 and a minimum internal cross dimension (e.g., inner diameter) that is substantially the same as (e.g., slightly greater than) a maximum outer cross-dimension (e.g., outer diameter) of the pin body 186. Furthermore, an outer surface (not labeled) of the bearing structure 214 may be rigidly fixed or otherwise non-movable relative to the central body 104. In one arrangement, any appropriate sealing ring or gasket 218 may be disposed within each aperture 124, 128, 132, 136 between the bearing structure 214 and the respective yoke ear 158, 162 to inhibit the intrusion of moisture and debris into the respective bearing structure 214 as well as provide a sealed cavity for containing a lubricant (e.g., grease, oil, etc.) to facilitate rotation of the trunnions 178 relative to the bearing structures 214 and the locking assembly 222 (discussed further below). See FIGS. 1 and 4. In another arrangement, the sealing ring 218 may form part of the respective yoke ear 158, 162 and contact the respective trunnion 178 on an outside surface of the central body 104.

To assemble the universal joint 100, the bearing structures 214 and gaskets 218 (if provided) may be appropriately inserted into and set within each of the apertures 124, 128, 132, 136 of the central body 204. In one arrangement, the bearing structures 214 and gaskets 218 may be fixed within the apertures 124, 128, 132, 136 as part of the manufacturing of the central body 204 in any appropriate manner. In any event, the first and second apertures $170_1$, $174_1$ of the first yoke portion $108_1$ may be disposed over and aligned with the first and second apertures 124, 128 of the central body 104 and the first and second apertures $170_2$, $174_2$ of the second yoke portion $108_2$ may be disposed over and aligned with the third and fourth apertures 124, 128 of the central body 104. See FIGS. 1-4. Thereafter, the free end 190 of a first trunnion $178_1$ may be inserted through the first aperture $170_1$ of the first yoke portion $108_1$ and the first aperture 124 of the central body 104, the free end 190 of a second trunnion $178_2$ may be inserted through the second aperture $174_1$ of the first yoke portion $108_1$ and the second aperture 128 of the central body 104, the free end 190 of a third trunnion $178_3$ may be inserted through the first aperture $170_2$ of the second yoke portion $108_2$ and the third aperture 128 of the central body 104, and the free end 190 of a fourth trunnion $178_4$ may be inserted through the second aperture $174_2$ of the second yoke portion $108_2$ and the fourth aperture 136 of the central body 104.

Each trunnion 178 may be inserted until its head 182 is seated in the depression 194 of the respective one of the first and second apertures $170_1/170_2$, $174_1/174_2$ as discussed previously (e.g., so that the outer periphery 206 of the head 182 generally matches the side wall 202 of the depression 194 and so that the bottom surface 210 of the head 182 is configured to contact the bottom surface 198 of the depression 194). See FIGS. 1, 4, 7, and 9. At this point, each trunnion 178 is non-rotatable relative to its respective yoke portion $108_1$, $108_2$ such that the first yoke portion $108_1$ and first and second trunnions $178_1$, $178_2$ can all rotate as a single unit about the first reference axis 116, and such that the second yoke portion $108_2$ and third and fourth trunnions $178_3$, $178_4$ can all rotate as a single unit about the second reference axis 120.

Furthermore, the first and second trunnions $178_1$, $178_2$ can be secured against movement along the first reference axis 116 and the third and fourth trunnions $178_3$, $178_4$ can be secured against movement along the second reference axis 116 (while allowing for rotation of the first and second trunnions $178_1$, $178_2$ about the first reference axis 116 relative to the central body 104 and rotation of the third and fourth trunnions $178_3$, $178_4$ about the second reference axis 120 relative to the central body 104) in any appropriate manner. Because the bottom surface 210 of the head 182 is configured to contact the bottom surface 198 of the depression 194 when seated in the depression, securing the trunnions 178 against movement along the respective first or second reference axis 116, 120 also necessarily secures the first and second ears $158_1$, $162_1$ of the first yoke portion $108_1$ against outward movement or spreading along the first reference axis 116 and secures the first and second ears $158_2$, $162_2$ of the second yoke portion $108_2$ against outward movement or spreading along the second reference axis 120. Preventing or inhibiting the tendency of yoke ears to spread during high torque operation of the joint 100 advantageously increases the useful life of the joint 100.

Figure 29:
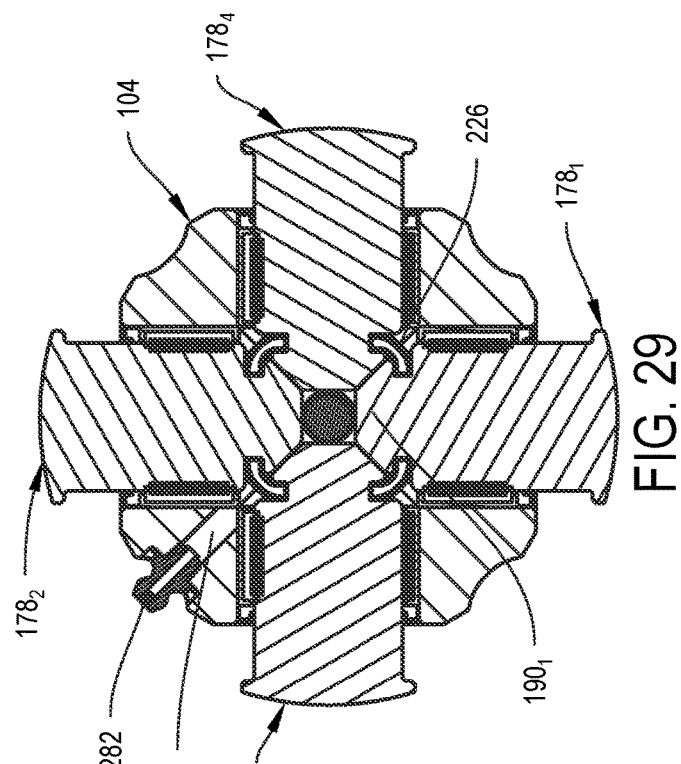
FIG. 29 is a sectional view along the line 29-29 of FIG. 27.

As an example, any appropriate locking assembly 222 may be inserted into the internal cavity 122 of the central body 104 and into engagement with the trunnions 178 to inhibit movement of the trunnions 178 along the respective first or second reference axis 116, 120. See FIGS. 1, 2, and 29, where the first and second yoke portions $108_1$, $108_2$ have been removed in FIG. 29 for clarity. In one arrangement, the locking assembly 222 may include a first locking member 226 that is configured for insertion into the fifth aperture 140 of the central body 104 and into engagement with the pin bodies 186 of the various trunnions 178 within the internal cavity 122 of the central body 104. For instance, the first locking member 226 may include a head 230 and a body 234 extending away from the head 230, where the body 234 includes a plurality of engagement portions 238 that are configured to engage with corresponding engagement portions 188 of the pin bodies 186.

In one embodiment, the engagement portion 188 of each pin body 186 may be in the form of an opening (e.g., slot, groove) extending partially or fully about an outer surface of the pin body 186 and each engagement portion 238 of the first locking member 226 may be in the form of a projection (e.g., wall, protrusion, etc.) that is sized, shaped, and/or otherwise configured for receipt in the opening of the pin bodies 186 in a manner that inhibits axial movement of the trunnions 178 along the respective first or second reference axis 116, 120 (again, while simultaneously allowing for rotation of the trunnions 178 about the respective first or second reference axis 116, 120 relative to the central body 104 and locking assembly 222). For instance, it can be seen how each respective set of engagement portions 188, 238 extends along a reference plane (not labeled) that is perpendicular to the respective first or second reference axis 116, 120 of the trunnion 178 to allow for rotation of the trunnions 178 while inhibiting axial movement 178). In another embodiment and while not shown, each engagement portion 188 of each pin body 186 may be in the form of a projection extending partially or fully about an outer surface of the pin body 186 and each engagement portion 238 of the first locking member 226 may be in the form of an opening that is sized, shaped, and/or otherwise configured for receipt of the projection of the pin bodies 186 in a manner that inhibits axial movement of the trunnions 178 along the respective first or second reference axis 116, 120.

Figure 28:
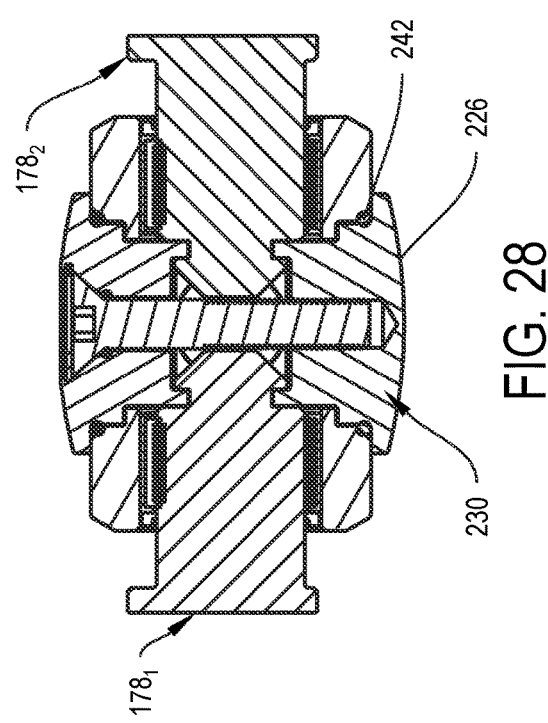
FIG. 28 is a sectional view along the line 28-28 of FIG. 27.

The first locking member 226, central body 104 and trunnions 178 may be configured so that upon insertion of the first locking member 226 into the fifth aperture 140 along the third reference axis 150, the head 230 of the first locking member 226 in configured to contact the housing 122 of the central body 104 substantially simultaneous with the engagement portions 238 of the first locking member 226 engaging with the engagement portions 188 of the trunnions 178. See FIGS. 4 and 28. In one arrangement, a sealing ring or gasket 242 may be positioned in the fifth aperture 140 to inhibit debris and fluids from intruding into the internal cavity 122 of the central body 104 as well as provide a sealed interior for lubricant. For instance, the fifth aperture 140 may include a depression therein (not labeled) including one or more steps (not labeled) that are configured to receive one or more gaskets 242 for compression thereof by the first locking member 226 (e.g., between a lower surface of the head 230 and a step of the fifth aperture 140). See FIGS. 4 and 28.

In one embodiment, the locking assembly 222 may include a second locking member 246 that that is configured for insertion into the sixth aperture 144 of the central body 104 and into engagement with the pin bodies 186 of the various trunnions 178 within the internal cavity 122 of the central body 104. See FIGS. 1, 4, 7, 9, 18, and 28. The second locking member 246 may include a head 250 and a body 254 extending away from the head 250, where the body 254 includes a plurality of engagement portions 258 that are configured to engage with the engagement portions 188 of the pin bodies 186. For instance, the engagement portions 258 may be similar to the engagement portions 238 of the first locking member 226. A sealing ring or gasket 262 may also be disposed within the sixth aperture 144 to inhibit the intrusion of debris or moisture into the internal cavity 122 as well as provide a sealed interior for lubricant.

To secure the first and second locking members 226, 246 against inadvertent removal from the central body 104 (and thus to ensure that the first and second locking members 226, 246 continue to engage with the trunnions 178 to inhibit movement thereof along the respective first and second reference axes 116, 120), the first and second locking members 226, 246 may be selectively secured to each other in any appropriate manner. In one arrangement, a fastener 266 may be inserted through an aperture 270 in the second locking member 246 along the third reference axis 150, between the free ends 190 of the various trunnions 178, and then threaded into an aperture 228 in the first locking member 226 to draw the heads 230, 250 of the first and second locking members 226, 246 against the central body 104. See FIGS. 4 and 28. A sealing ring or gasket 274 may be inserted into the aperture 270 in the second locking member before insertion of the fastener 266 to inhibit the intrusion of debris or moisture into the internal cavity 122 as well as provide a sealed interior for lubricant. In one variation, a locking ring 276 may be disposed about a head (not labeled) of the fastener 266 to inhibit unintentional removal thereof. See FIG. 2.

Any appropriate lubricant (e.g., oil, grease) may be disposed in the internal cavity 122 of the central body 104 to facilitate rotation of the trunnions 178 relative to the bearing structures 214 and the locking assembly 222. For instance, the housing 121 of the central body 104 may include one or more channels 278 therethrough extending from an outside surface of the housing into the internal cavity 122 for injection or insertion of such lubricant. Each channel 278 may be selectively closed by a removable plug 282 (e.g., cap) or the like.

Figure 5:
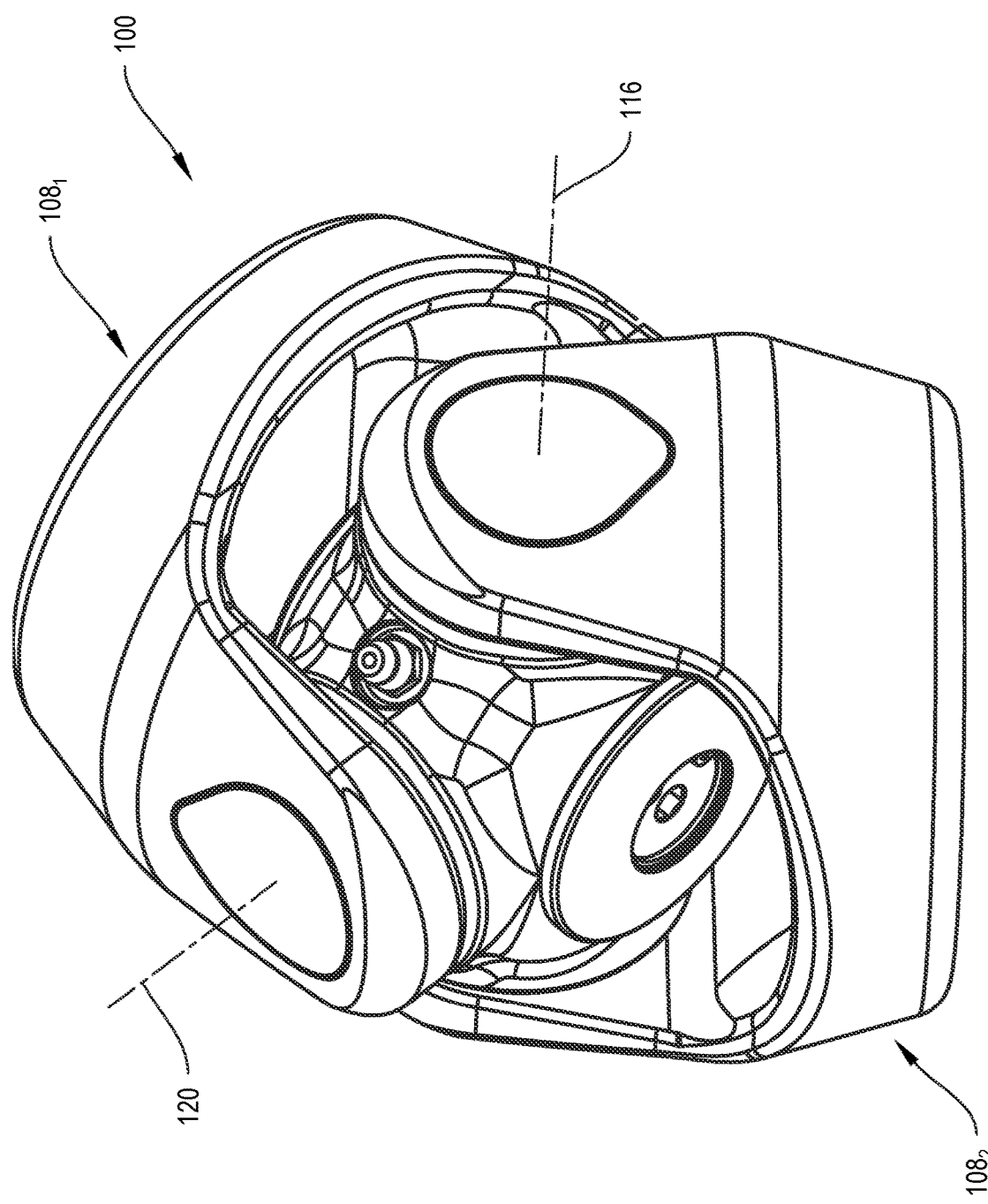
FIG. 5 is a perspective view similar to FIG. 1 but with the first and second yoke portions being in a different position relative to each other.
Figure 7:
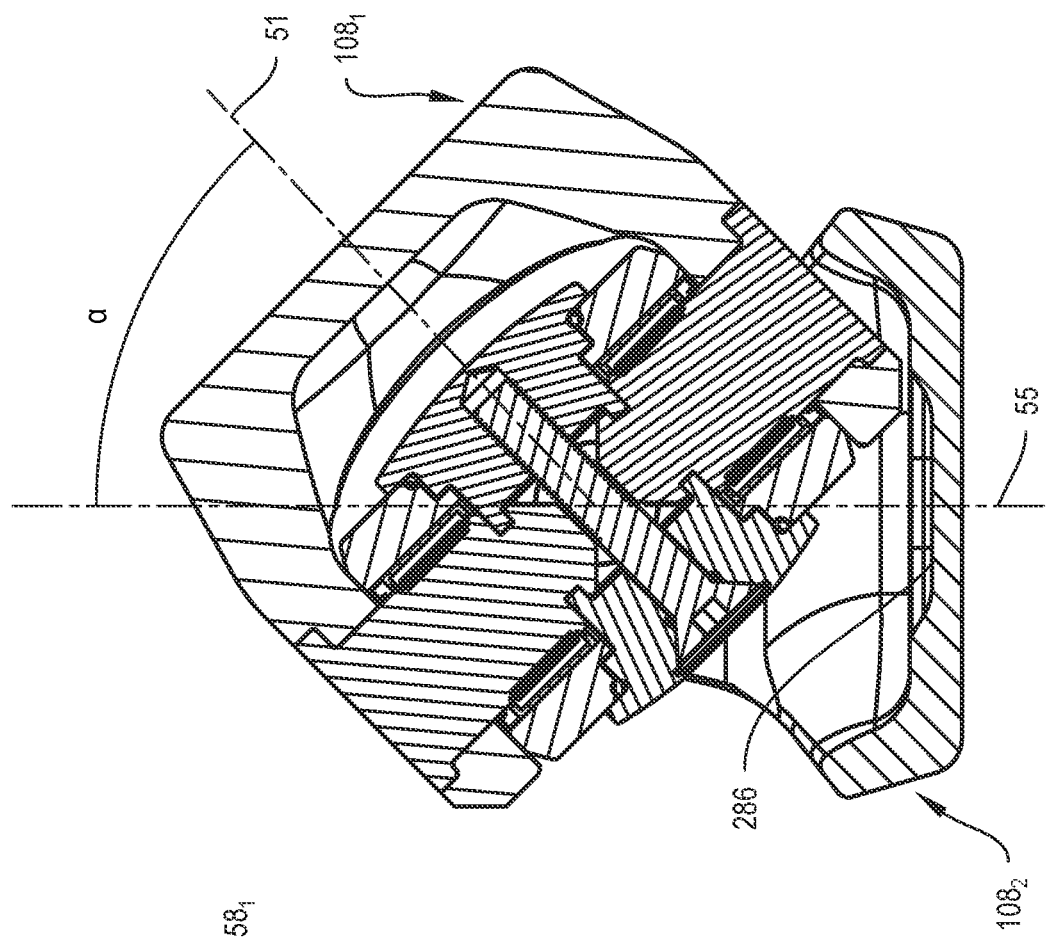
FIG. 7 is a sectional view along the line 7-7 of FIG. 6.
Figure 6:
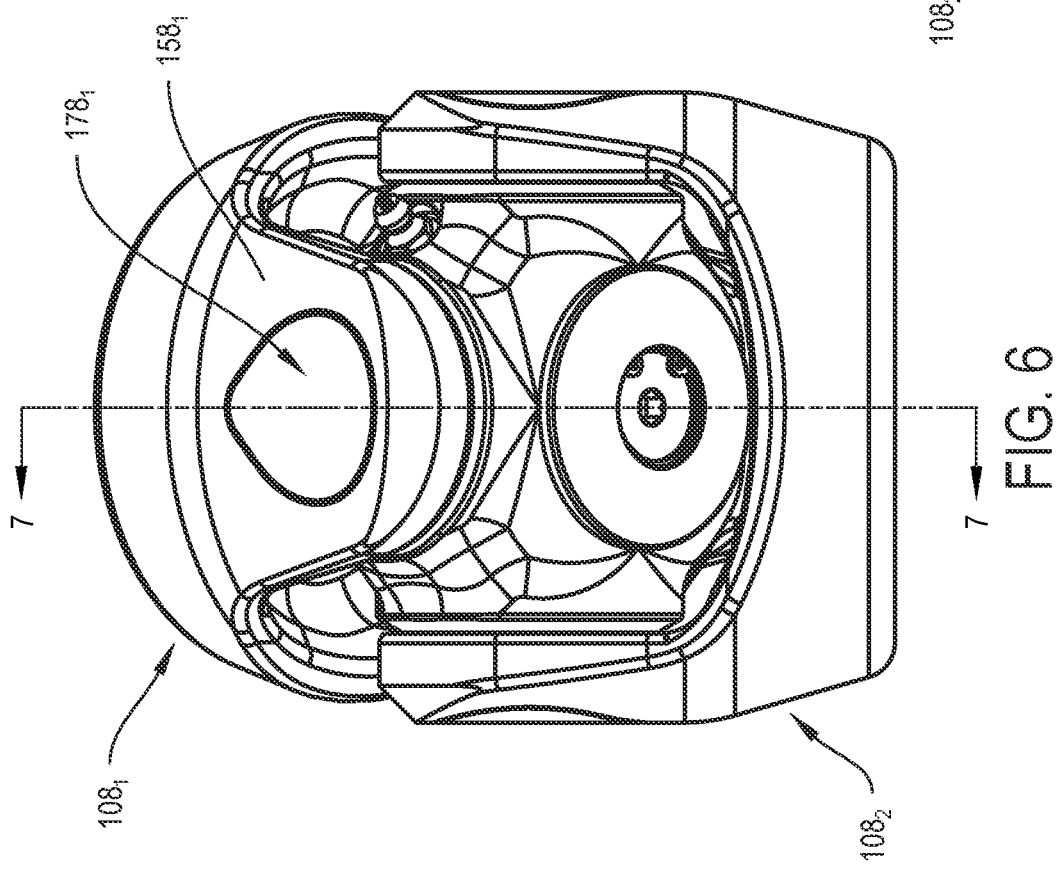
FIG. 6 is an elevational view of the universal joint of FIG. 5.
Figure 11:
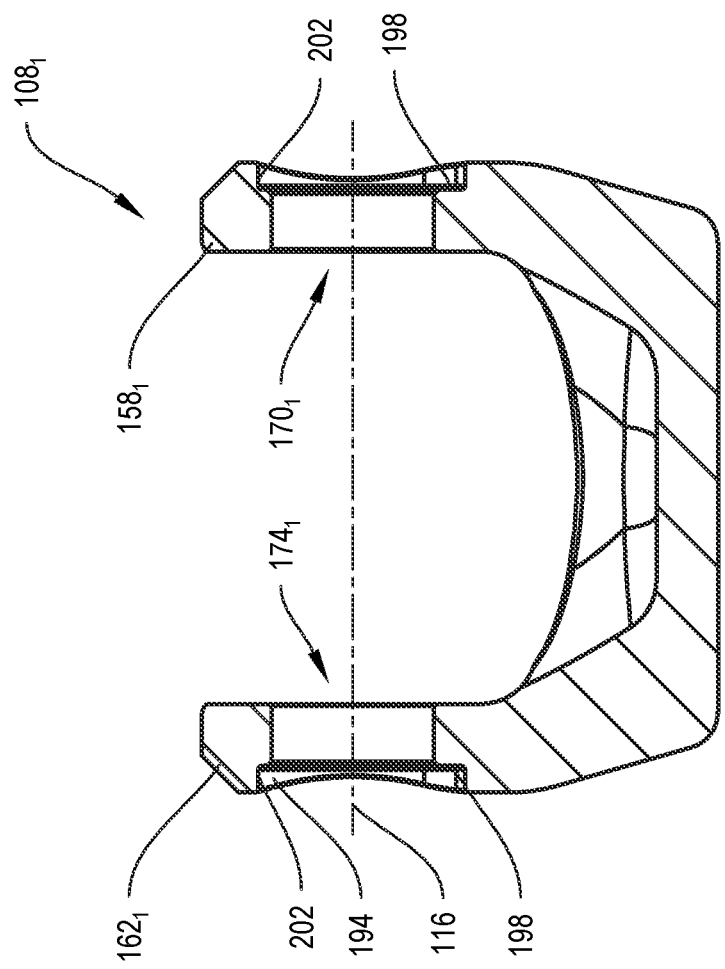
FIG. 11 is a sectional view along the line 11-11 of FIG. 10.
Figure 10:
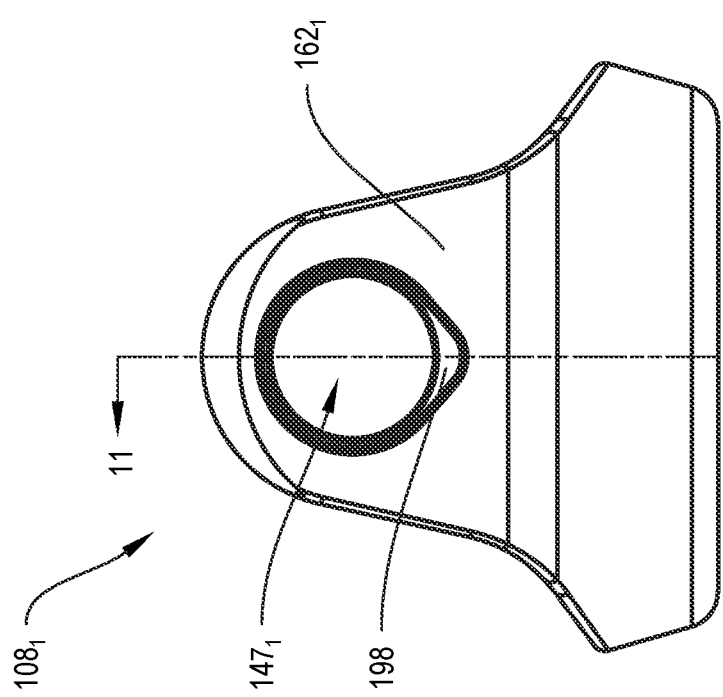
FIG. 10 is an elevational view of the first yoke portion of FIG. 1.
Figure 13:
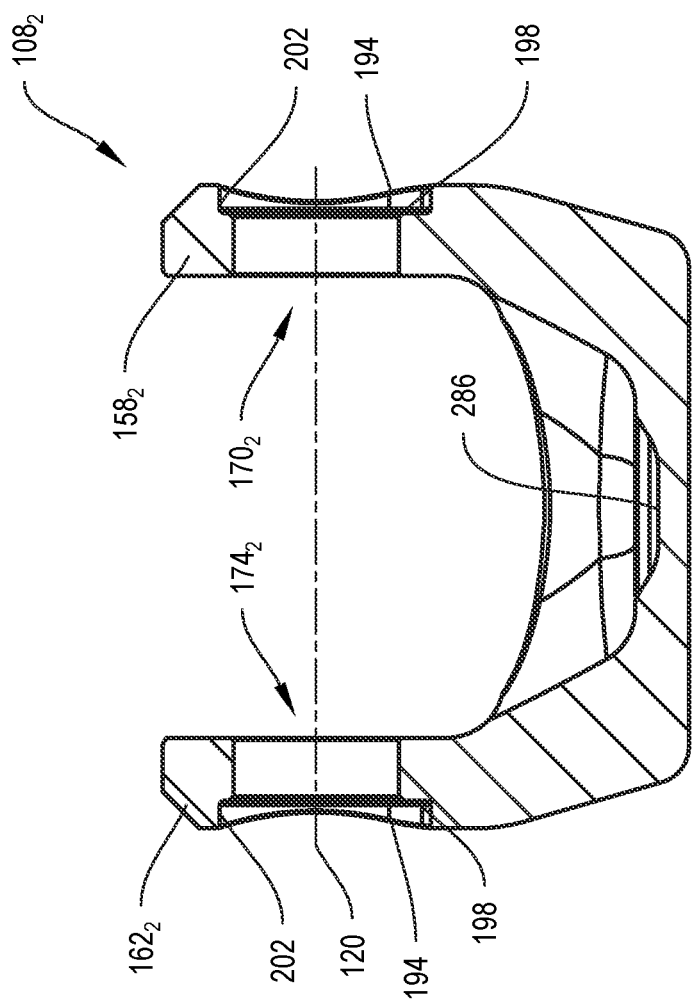
FIG. 13 is a sectional view along the line 13-13 of FIG. 12.
Figure 12:
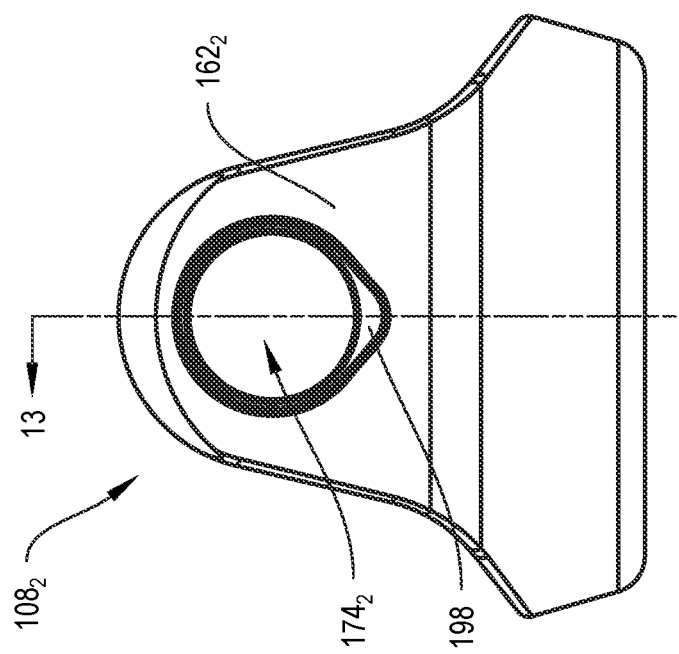
FIG. 12 is an elevational view of the second yoke portion of FIG. 1.
Figure 14:
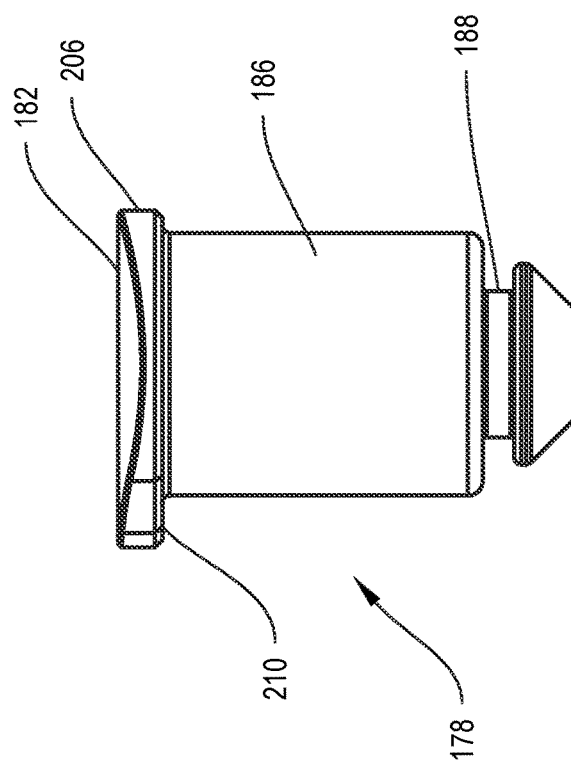
FIG. 14 is a perspective view of a trunnion for pivotally attaching one of the first and second yoke portions to the central body of FIG. 1.
Figure 17:
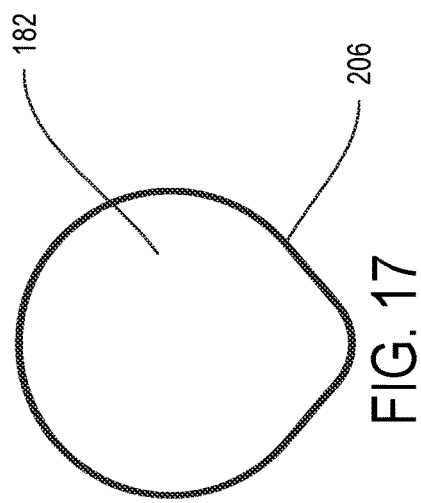
FIG. 17 is a plan view of the trunnion of FIG. 14.
Figure 16:
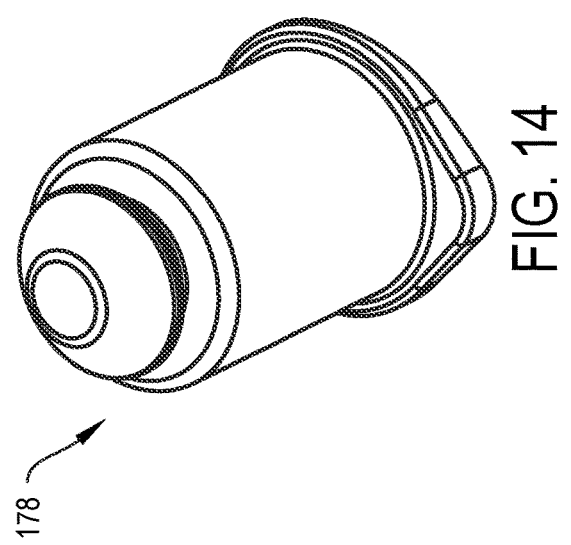
FIG. 16 is a second elevational view of the trunnion of FIG. 14.
Figure 15:
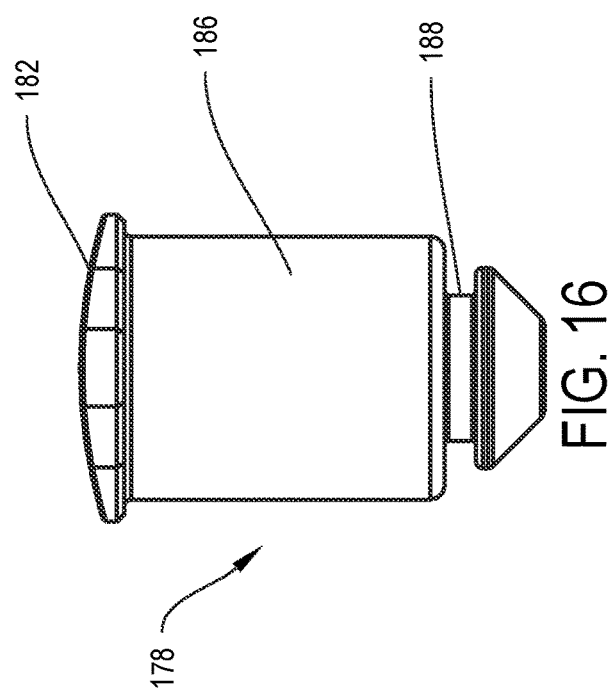
FIG. 15 is a first elevational view of the trunnion of FIG. 14.
Figure 19:
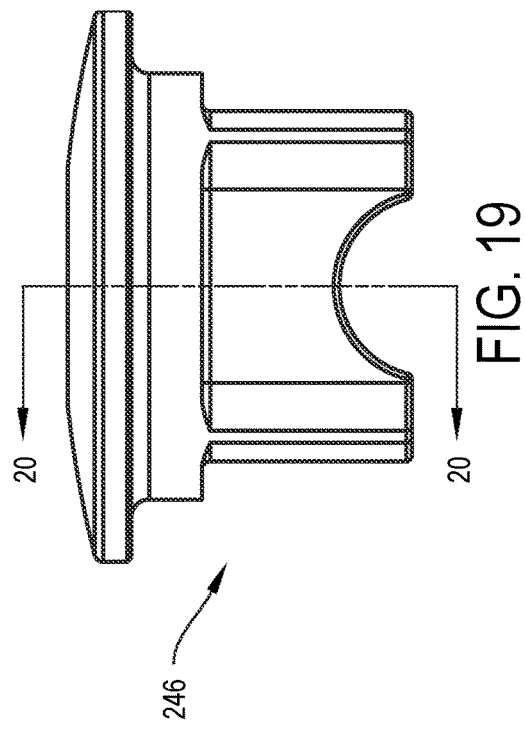
FIG. 19 is an elevational view of the locking member of FIG. 18.
Figure 21:
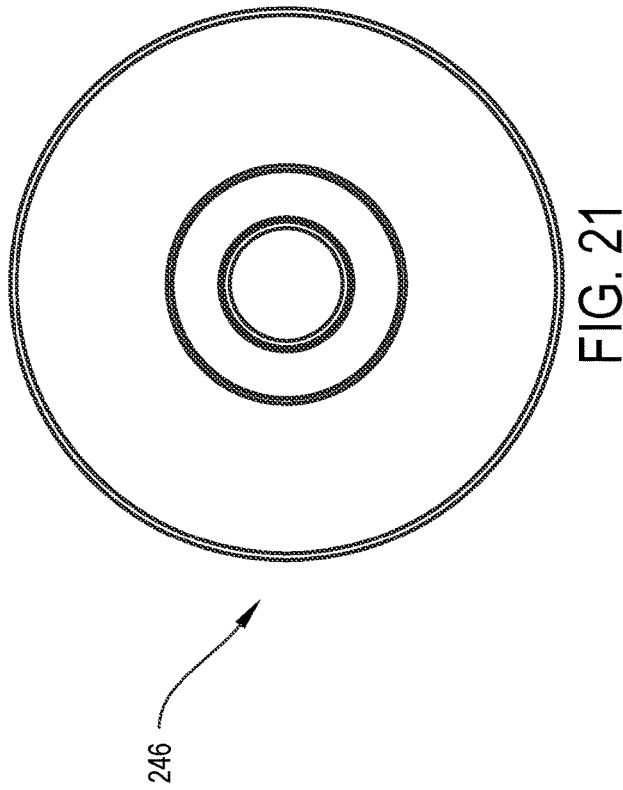
FIG. 21 is a plan view of the locking member of FIG. 18.
Figure 18:
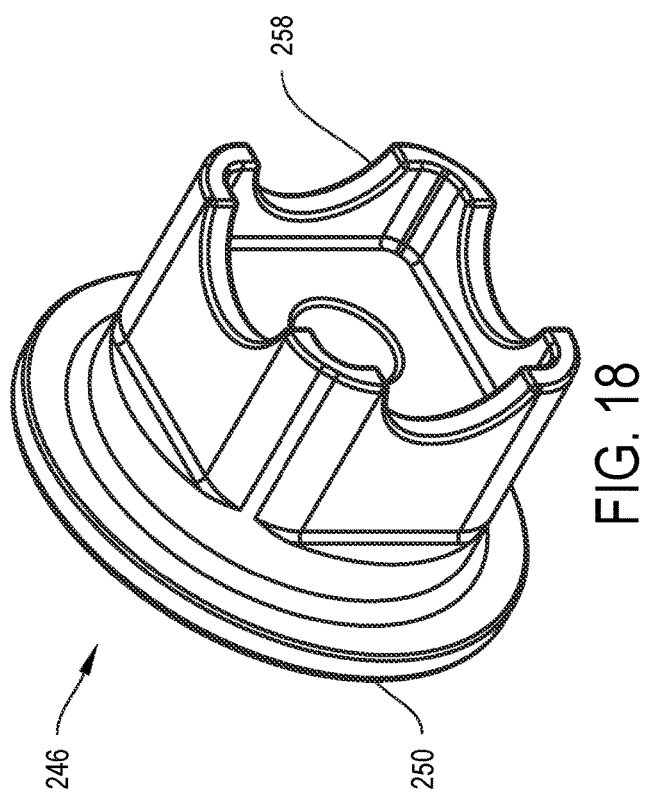
FIG. 18 is a perspective view of a locking member for inhibiting axial movement of the trunnion of FIG. 14 when secured to the central body.
Figure 20:
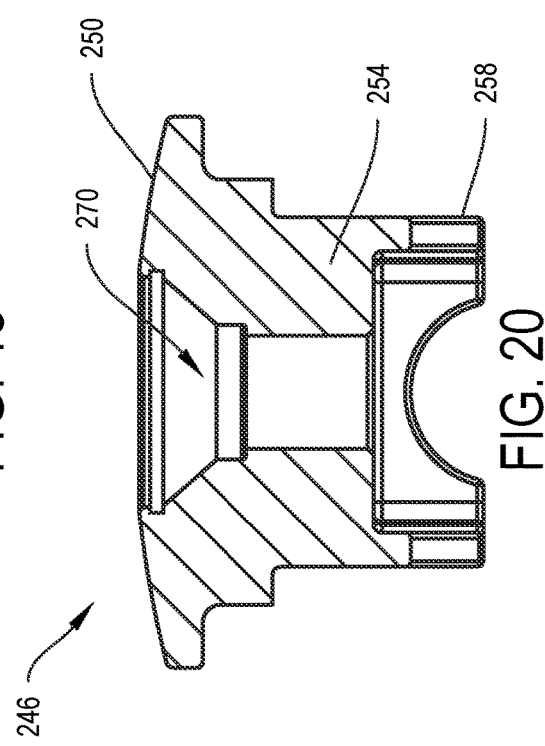
FIG. 20 is a sectional view along the line 20-20 of FIG. 19.
Figure 23:
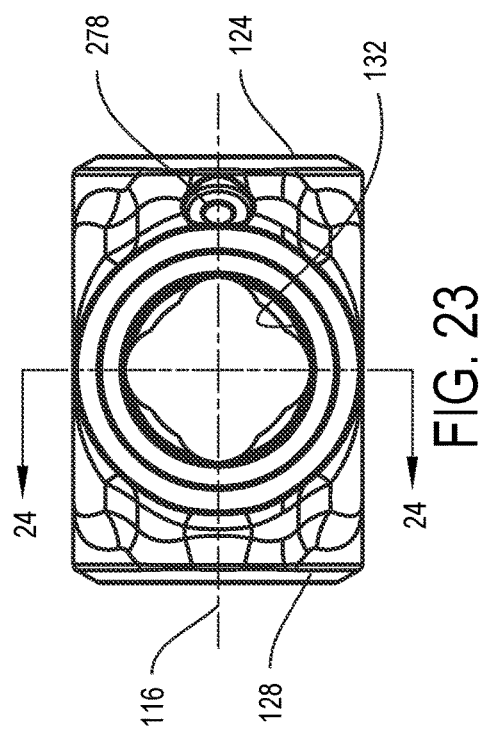
FIG. 23 is an elevational view of the central body of FIG. 22.
Figure 25:
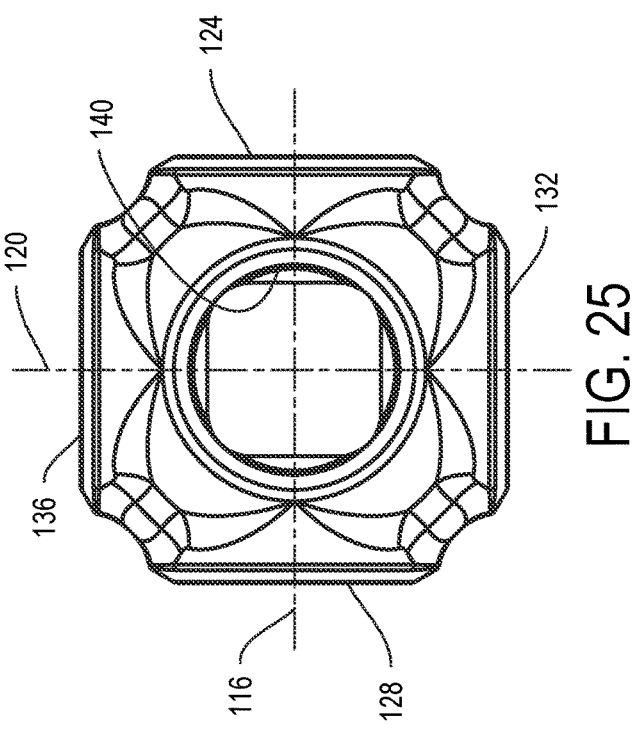
FIG. 25 is a plan view of the central body of FIG. 22.
Figure 22:
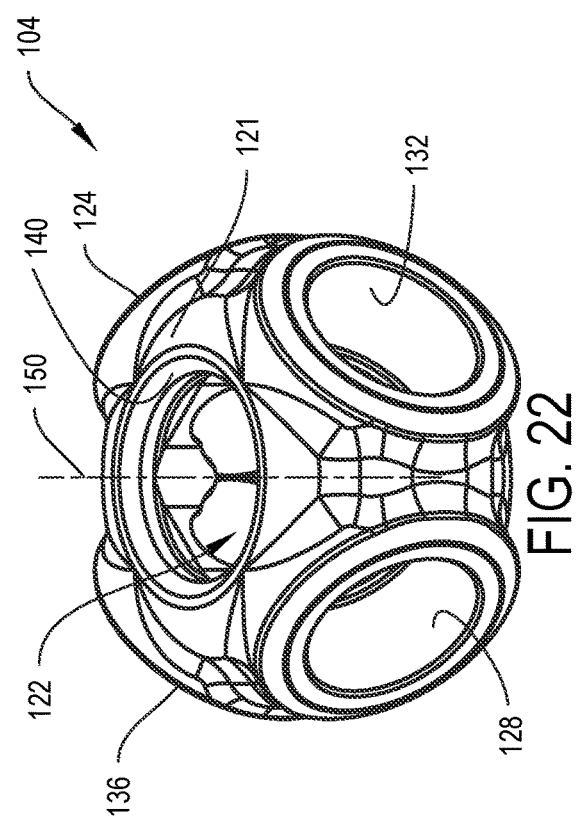
FIG. 22 is a perspective view of the central body of FIG. 1.
Figure 24:
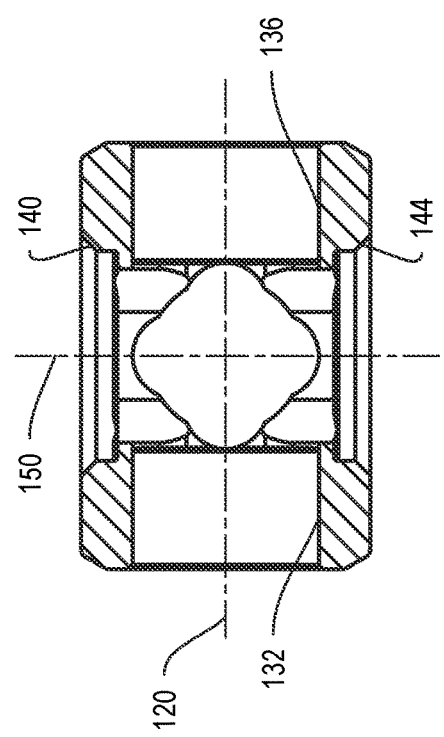
FIG. 24 is a sectional view along the line 24-24 of FIG. 23.
Figure 27:
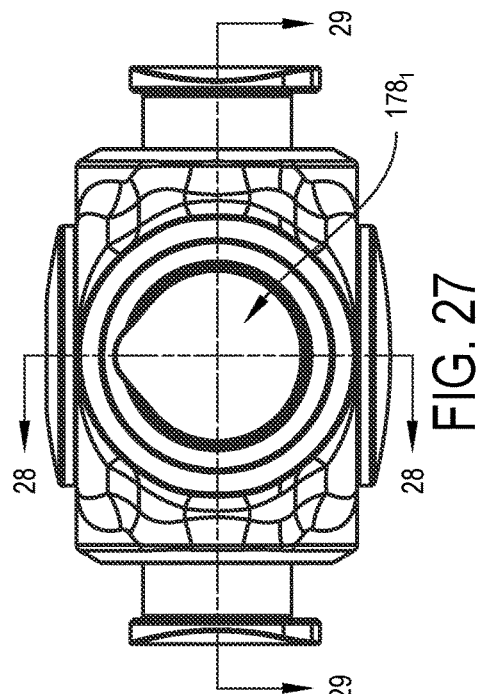
FIG. 27 is an elevational view of the central body of FIG. 26.
Figure 26:
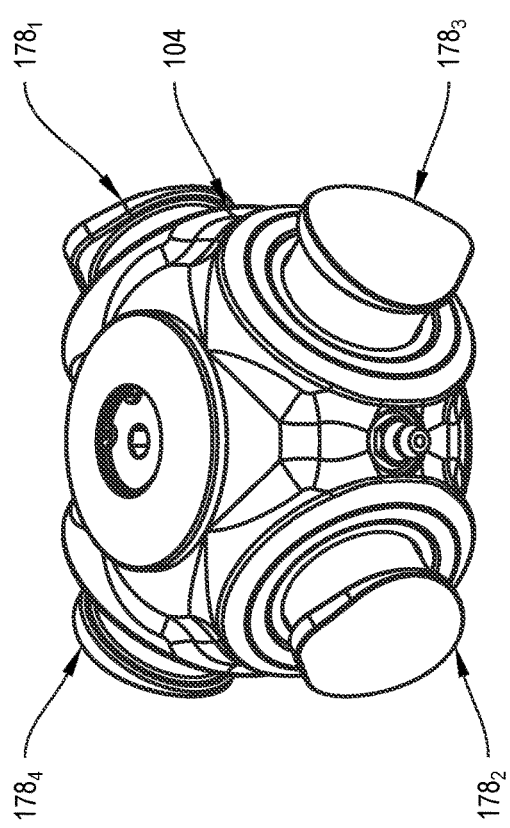
FIG. 26 is a perspective view of the central body of FIG. 1 with trunnions being inserted into the central body and the yoke portions removed for clarity.

FIGS. 5-7 illustrate the universal joint 100 with one of the first and second yoke portions $108_1$, $108_2$ being pivoted about its respective first or second reference axis 116, 120 relative to the other of the first and second yoke portions $108_1$, $108_2$ so as to position the longitudinal axes 51, 55 of the first and second shafts 50, 54 (the shafts 50, 54, not being shown in FIGS. 5-7 for clarity) at an angle G. FIGS. 8-9 illustrate the angle σ being at a greater value than that in FIGS. 5-7 to allow for access to the fastener 266. In one arrangement, an inside portion of the bridge portion $166_2$ of the second yoke portion $108_2$ may include a depression 286 therein to allow for a portion of the first yoke portion $108_2$ to pass therein.

The various portions of the disclosed universal joint 100 may be constructed of any appropriate materials and of any appropriate dimensions. It will be readily appreciated that many deviations may be made from the specific embodiments disclosed in the specification without departing from the spirit and scope of the invention. For instance, while the locking assembly 222 is illustrated as having the first and second locking members 226, 246 and the fastener 266, the locking assembly 222 may in some embodiments utilize only a single locking member that is configured to grab around a substantial entirety of each trunnion 178. In another example, the first and second locking members 226, 246 may be configured to directly engage with each other. In one arrangement, the first and second locking members 226, 246 may be configured to engage with the central body 104 itself (e.g., via a non-circular through holes in the central body 104 to inhibit spinning of the first and second locking members 226, 246). As a further example, different locking members may be configured to grab different ones of the trunnions 178. In one arrangement, the pin body 186 of each trunnion 178 may be configured to make direct contact with the inner wall of the aperture 174 of the respective yoke portion 108 (e.g., where no bearing structure 214 would be included). In another arrangement, an inner surface of each of the first and second apertures $170_1/170_2$, $174_1/174_2$ may be tapered in a direction from outside the central body 104 to the interior cavity 122 of the central body 104 to prevent the trunnions 178 from passing therethrough and to inhibit spreading of respective pairs of yoke ears (e.g., instead of the depression 194 being provided). Various other arrangements are envisioned.

Certain features that are described in this specification in the context of separate embodiments or arrangements can also be implemented in combination in a single embodiment or arrangement. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:
1. A universal joint comprising:
a central body having first and second opposite apertures through which a first reference axis is defined;
a first yoke portion that is configured to be secured to a first torque transmitting shaft, wherein the first yoke portion includes a first yoke ear and a second yoke ear that are respectively disposed over the first and second opposite apertures, the first yoke ear and the second yoke ear each having a depression formed in an outward-facing surface, the depression having a non-circular outer perimeter that surrounds a through-hole;

a first attachment member seated in the depression of the first yoke ear and securing the first yoke ear to the central body by extending through the through-hole of the first yoke ear; and a second attachment member seated in the depression of the second yoke ear and securing the second yoke ear to the central body by extending through the through-hole of the second yoke ear.

2. The universal joint of claim 1, wherein the first attachment member has a non-circular outer perimeter that is seated within the depression of the first yoke ear of the first yoke portion to prevent rotation of the first attachment member relative to the first yoke ear, and wherein the second attachment member has a non-circular outer perimeter that is seated within the depression of the second yoke ear of the first yoke portion to prevent rotation of the second attachment member relative to the second yoke ear.

3. The universal joint of claim 1, wherein the depression of each of the first and second opposite apertures of the first yoke portion is defined by a lower surface, wherein the first and second attachment members each include a surface that contacts the lower surface of the corresponding depression of the first yoke portion to inhibit movement of the first yoke ear and t the second yoke ear of the first yoke portion in first and second opposite direction along the first reference axis.

4. The universal joint of claim 1, wherein the central body further includes third and fourth opposite apertures through which a second reference axis is defined and wherein the universal joint further comprises:

a second yoke portion that is configured to be secured to a second torque transmitting shaft, wherein the second yoke portion includes first and second spaced opposite ears that are respectively disposed over the third and fourth opposite apertures.

5. The universal joint of claim 4, wherein the first yoke ear and the second yoke ear of the second yoke portion each have a depression formed in an outward-facing surface, the depression having a non-circular outer perimeter that surrounds a through-hole.

6. The universal joint of claim 5, further comprising:
a third attachment member seated in the depression of the first yoke ear of the second yoke portion and securing the first yoke portion to the central body along the second reference axis; and
a fourth attachment member seated in the depression of the second yoke ear of the second yoke portion and securing the second yoke portion to the central body along the second reference axis.

7. A universal joint comprising:
a central body having first and second opposite apertures through which a first reference axis is defined;
a first yoke portion that is configured to be secured to a first torque transmitting shaft, wherein the first yoke portion includes a first yoke ear and a second yoke ear that are respectively disposed over the first and second opposite apertures;
a first attachment member inserted through the first yoke ear of the first yoke portion to secure the first yoke ear to the central body, the first attachment member having a non-circular outer perimeter seated within a corresponding depression formed on an outer surface of the first yoke ear, the corresponding depression having a non-circular outer perimeter sized and shaped to receive the non-circular outer perimeter of the first attachment member to inhibit rotation of the first attachment member relative to the first yoke portion and thereby prevent wear on the first yoke ear of the first yoke portion; and a second attachment member inserted through the second yoke ear of the first yoke portion to secure the second yoke ear to the central body, the second attachment member having a non-circular outer perimeter being seated within a corresponding depression formed on an outer surface of the second yoke ear, the corresponding depression having a non-circular outer perimeter sized and shaped to receive the non-circular outer perimeter of the second attachment member to inhibit rotation of the second attachment member relative to the first yoke portion and thereby prevent wear on the second yoke ear of the first yoke portion.

8. The universal joint of claim 7, wherein the central body further includes third and fourth opposite apertures through which a second reference axis is defined and wherein the universal joint further comprises:

a second yoke portion that is configured to be secured to a second torque transmitting shaft, wherein the second yoke portion includes first and second spaced opposite ears that are respectively disposed over the third and fourth opposite apertures.

9. The universal joint of claim 8, further comprising:
a third attachment member secured to the central body and inserted through the first yoke ear of the second yoke portion, the first attachment member having a non-circular outer perimeter seated within a corresponding depression formed on an outer surface of the second yoke ear, the corresponding depression having a non-circular outer perimeter sized and shaped to receive the non-circular outer perimeter of the third attachment member to inhibit rotation of the third attachment member relative to the second yoke portion; and
a fourth attachment member secured to the central body and inserted through the second yoke ear of the second yoke portion, the second attachment member having a non-circular outer perimeter seated within a corresponding depression formed on an outer surface of the second yoke ear of the second yoke portion, the corresponding depression having a non-circular outer perimeter sized and shaped to receive the non-circular outer perimeter of the fourth attachment member to inhibit rotation of the fourth attachment member relative to the second yoke portion.

10. The universal joint of claim 9, further including a locking assembly disposed within the central body and secured to the first, second, third, and fourth attachment members to inhibit movement thereof along the first reference axis and second reference axis, respectively.

11. The universal joint of claim 9, wherein the depression of each of the first and second opposite apertures of the second yoke portion is defined by a lower surface, wherein each of the third and fourth attachment members includes a surface that contacts the lower surface of the corresponding depression of second yoke portion to inhibit movement of the first yoke ear and the second yoke ear of the second yoke portion in first and second opposite direction along the second reference axis.

12. The universal joint of claim 7, wherein the depression of each of the first and second opposite apertures of the first yoke portion is defined by a lower surface, wherein the first and second attachment members each include a surface that contacts the lower surface of the corresponding depression in the first yoke portion to inhibit movement of the first yoke ear and the second yoke ear of the first yoke portion in first and second opposite direction along the first reference axis.

13. A method of assembling a universal joint, comprising:
positioning a first yoke ear and a second yoke ear of a first yoke portion over respective first and second spaced apertures of a central body, the central body having first and second opposite apertures through which a first reference axis is defined;
inserting a first attachment member through the first yoke ear of the first yoke portion and the first aperture of the central body along a first reference axis until a non-circular perimeter of the first attachment member is seated within a corresponding depression with a non-circular outer perimeter formed on an outer surface of the first yoke ear of the first yoke portion to inhibit relative rotation between the first attachment member and the first yoke portion;
inserting a second attachment member through the second yoke ear of the first yoke portion and the first aperture of the central body along a second reference axis until a non-circular perimeter of the second attachment member is seated within a corresponding depression with a non-circular outer perimeter formed on an outer surface of the first yoke ear of the first yoke portion to inhibit relative rotation between the first attachment member and the first yoke portion.

14. The method of claim 13, wherein the central body further includes third and fourth opposite apertures through which a second reference axis is defined and wherein the method further comprises:
securing a second yoke portion to the central body, wherein the second yoke portion includes first and second spaced opposite ears that are respectively disposed over the third and fourth opposite apertures.

15. The method of claim 14, wherein securing a second yoke portion to the central body further comprises:
coupling a third attachment member to the central body by inserting the third attachment member through the first yoke ear of the second yoke portion and the third aperture of the central body until a non-circular perimeter of the third attachment member is seated within a corresponding depression with a non-circular outer perimeter formed on an outer surface of the first yoke ear of the second yoke portion;
coupling a fourth attachment member to the central body by inserting the fourth attachment member through the second yoke ear of the second yoke portion and the fourth aperture of the central body until a non-circular perimeter of the fourth attachment member is seated in a corresponding depression with a non-circular outer perimeter formed on an outer surface of the second yoke ear of the second yoke portion.

16. The method of claim 15, further including a locking assembly disposed within the central body and secured to the first, second, third, and fourth attachment members to inhibit movement thereof along the first reference axis and second reference axis, respectively.

17. The method of claim 15, wherein the depression of each of the first and second opposite apertures of the second yoke portion is defined by a lower surface, wherein each of the third and fourth attachment members includes a surface that contacts the lower surface of the corresponding depression of the second yoke portion to inhibit movement of the first yoke ear and the second yoke ear of the second yoke portion in first and second opposite direction along the second reference axis.

18. The method of claim 14, wherein the first reference axis and the second reference axis are perpendicular to one another.

19. The method of claim 13, wherein the depression of each of the first and second opposite apertures of the first yoke portion is defined by a lower surface, wherein the first and second attachment members each include a surface that contacts the lower surface of the corresponding depression in the first yoke portion to inhibit movement of the first yoke ear and the second yoke ear of the first yoke portion in first and second opposite direction along the first reference axis.

\* \* \* \* \*